March 17, 1953  W. H. SILVER ET AL  2,631,513
TRACTOR MOUNTED LISTER OR BEDDER
Filed Dec. 5, 1947  3 Sheets-Sheet 3

INVENTORS.
WALTER H. SILVER
WILLIAM V. LOHRMAN
BY
ATTORNEYS

Patented Mar. 17, 1953

2,631,513

UNITED STATES PATENT OFFICE 2,631,513

TRACTOR MOUNTED LISTER OR BEDDER

Walter H. Silver, Moline, and William V. Lohrman, Davenport, Ill., assignors to Deere & Company, Moline, Ill., a corporation of Illinois Application December 5, 1947, Serial No. 789,934

2 Claims. (Cl. 97—47)

The present invention relates generally to agricultural implements and more particularly to tractor mounted ground working implements.

The object and general nature of the present invention is the provision of a new and improved lister or bedder of the tractor mounted or integral type especially constructed and arranged for quick attachment to or disconnection from its supporting tractor. More particularly, it is a feature of this invention to provide a lister or bedder having new and improved means for controlling the depth of operation of the lister or bedder bottoms, and still further, it is a feature of this invention to provide raising and lowering mechanism operative through one range for adjusting the depth of operation of the tools or bottoms and operative through another range to raise the tools or bottoms into a raised or transport position.

These and other objects and advantages of the present invention will be apparent to those skilled in the art after a consideration of the following detailed description, taken in conjunction with the accompanying drawings, in which:

Figure 5 is a fragmentary plan view showing how the tools are disposed in their narrow row setting.

Figure 1:
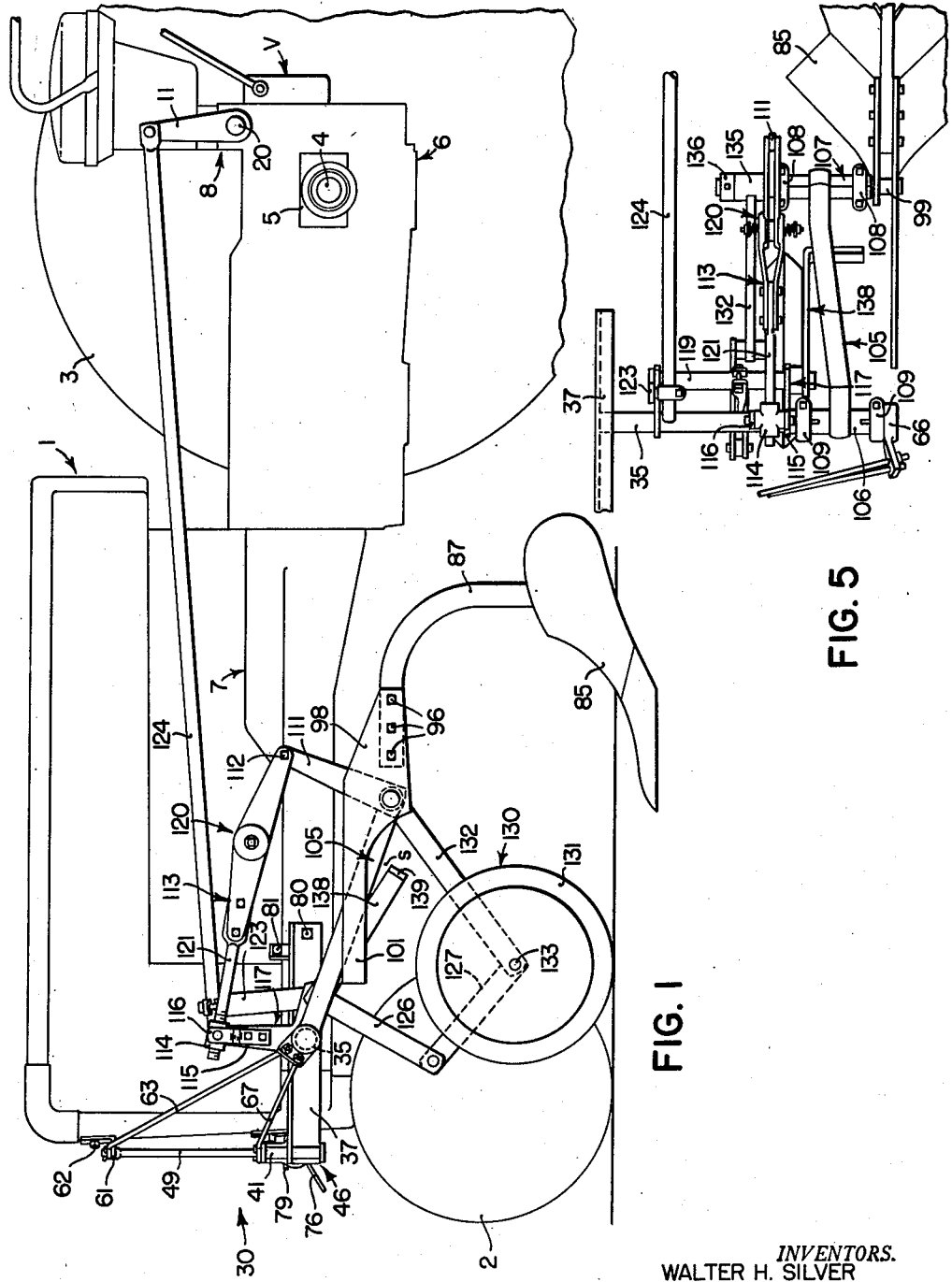
Figure 1 is a side view of a tractor mounted lister or bedder in which the principles of the present invention have been incorporated.
Figure 2:
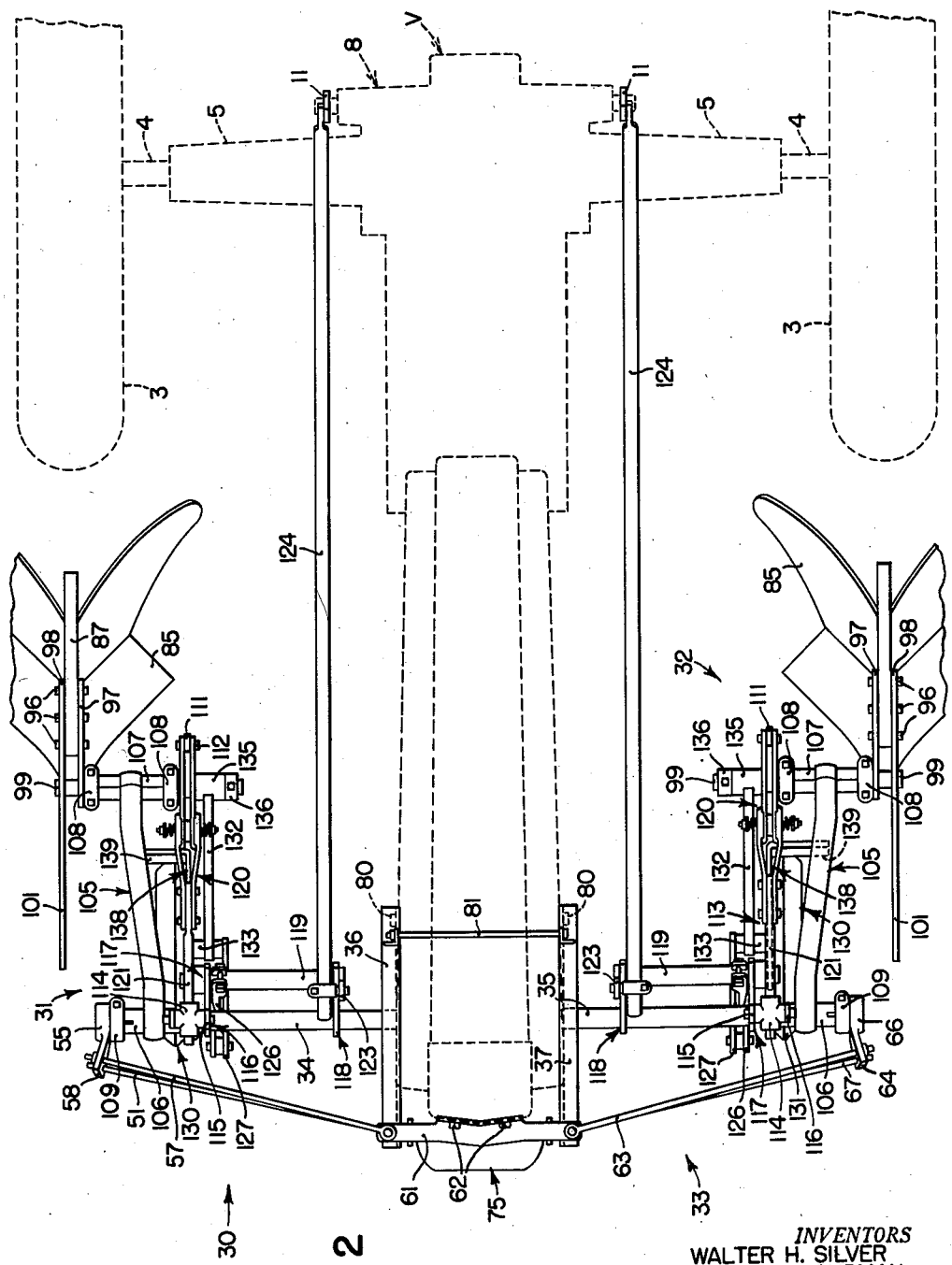
Figure 2 is a plan view of the implement shown in Figure 1.
Figure 3:
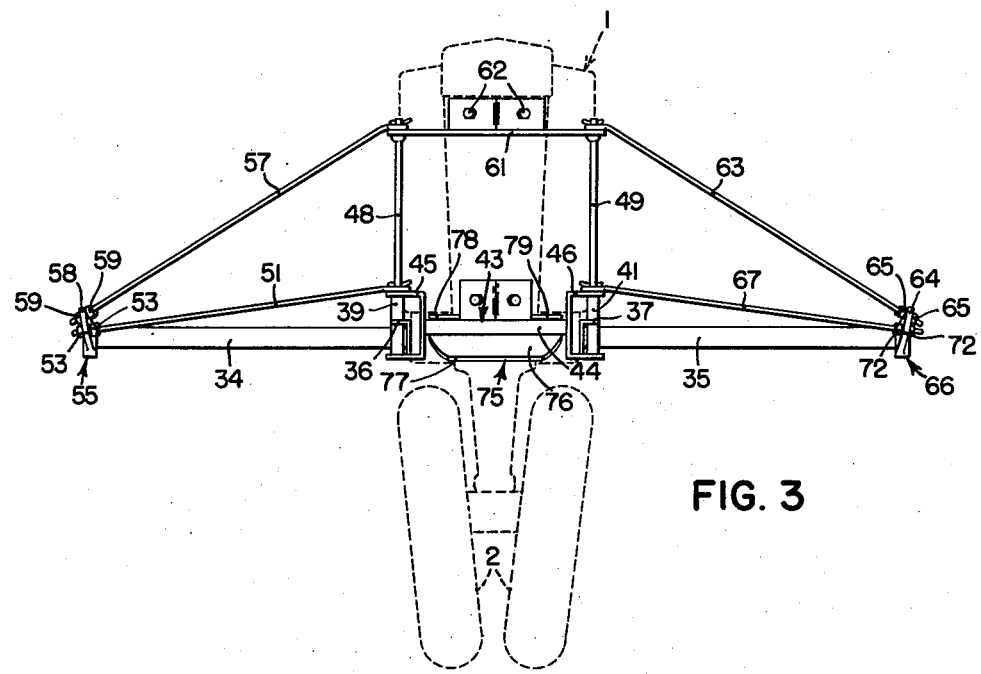
Figure 3 is a fragmentary front end view.

Referring now more particularly to Figures 1 and 2, the tractor is indicated in its entirety by the reference numeral 1 and includes a pair of closely spaced front wheels 2 and a pair of wide spaced rear traction wheels 3 mounted on axle shafts 4 that are carried in extensions 5 forming a part of the rear axle structure 6 of the tractor. The tractor includes a power plant 7 and a power lift unit 8 of the hydraulic type, including suitable valve mechanism V and other necessary parts, such as a pair of lift arms 11 which are clamped or otherwise fixed in any suitable manner to the ends of a power lift rockshaft 20 which forms a part of the hydraulic unit 8. The arms 11 provide means whereby a power operating connection may be made with agricultural implements of various kinds, such as for example, a lister or bedder.

The lister or bedder implement, with which the present invention is more particularly concerned, is indicated in its entirety by the reference numeral 30 and comprises right and left hand implement units 31 and 32. Since for all practical purposes these implement units 31 and 32 are identical, except that certain parts may be right hand or left hand, as the case may be, a detailed description of the left hand unit 32 will suffice for a full and complete understanding of this invention. Both the right and left hand implement units 31 and 32 are connected to a quick detachable draft transmitting structure, indicated in its entirety by the reference numeral 33. Such structure includes a pair of laterally outwardly extending draft bars 34 and 35, fixed at their inner ends to a pair of attaching straps or angles 36 and 37. A vertically disposed bearing sleeve 39 is fixed, as by welding, to the forward end of the attaching member 36 and a similar vertically disposed bearing sleeve 41 is similarly attached to the forward end of the companion attaching member 37. A central attaching yoke 43 serves to connect the two attaching members 36 and 37 and preferably comprises a central bar 44 and a pair of yoke members 45 and 46, the latter members having upper and lower portions that are apertured to receive the lower end portions of a pair of vertical pivot rods 48 and 49 that extend through the yoke members 45 and 46 and the associated bearing sleeves 39 and 41, thus pivotally connecting the draft bars 34 and 35 to the center section 43. A brace rod 51, apertured at its inner end and receiving the pivot rods 48, extends laterally outwardly from the yoke 45 to the outer end of the draft rod 34, where the outer end of the brace rod 51 is connected in any suitable way, as by a pair of lock nuts 53, to an apertured lug 58 that forms a part of a cap or bracket 55 carried at the outer end of the draft member 34. A second brace rod 57 is connected at its upper end to the upper end of the pivot rod 48 and extends downwardly and laterally outwardly to the bracket 55 where it is connected to the latter through the lug 58 on the latter, being held in different positions of adjustment, like the brace rod 51, as may be necessary, by a pair of lock nuts 59 or similar means.

The upper ends of the two pivots rods 48 and 49 are interconnected by a cross brace 61 that is detachably connected to the front of the tractor by studs 62. The upper end of the left hand pivot rod 49 is connected by means of an upper brace rod 63 to an apertured lug 64 on a left hand bracket or cap 65. Like the brace rod 57, the brace rod 63 has its outer end threaded and receives a pair of adjusting lock nuts 65. A lower brace member 67 is connected at its inner end with the yoke 46 through the lower portion of the pivot rod 49 and is threaded at its outer end and extends through the apertured lug 64 on the bracket 66, being held in position by a pair of adjusting lock nuts 72. The center frame section 43 is adapted to be attached to the front end of the tractor 1 by means of an attaching socket member 75 that is bolted to the front portion of the tractor and which consists of a lower section 76 having a downturned lip portion 77 and a pair of upper sections 78 and 79 which may be flared upwardly and forwardly if desired but which in the main are spaced from the lower section 76 such a distance as to snugly receive the bar 44 on the central frame section 43 therebetween. Also, the tractor-carried socket member 75 is constructed so as to fit snugly between the two yokes 45 and 46 fixed on the ends of the central bar 44, whereby the draft frame 33 is held against lateral displacement relative to the socket member 75. The draft bars 34 and 35 may thus pivot about the rod members 48 and 49 relative to the center section 43 so as to swing the attaching members 36 and 37 toward and away from the sides of the tractor 1 in the connection and disconnection of the implement. The rear portions of the attaching members 36 and 37 are apertured to receive attaching means, such as bolts 80 and 81, which releasably clamp or fix the attaching members 36 and 37 to the sides of the tractor. The attaching frame structure 33 is substantially the same as the quick detachable attaching frame structure shown in U. S. Patent No. 2,423,148, issued July 1, 1947, to Theodore W. Johnson.

The left hand implement 32 is connected to the left hand draft bar 35 and includes a lister bottom 85 that is fixedly connected to a lister beam 87. The latter member is connected, as by bolts 96, to a pair of plates 97 and 98 that are fixed, as by welding, to the laterally outer end of a transverse implement or connecting bar 99, preferably in the form of a strong pipe or shaft. The laterally outer plate 98 is extended forwardly, as at 101, to receive a colter (not shown).

A draft link 105 serves to pivotally connect the transverse connecting bar 99 with the associated draft bar 35. The draft link 105 comprises a relatively rigid bar having a forward transverse sleeve section 106 fixed thereto at its forward end and a rear transverse sleeve section 107 fixed to the rear end of the bar 105. The latter sleeve section 107 is of split construction, including complementary parts held together about the shaft 99 by clamps 108. Each end of the forward transverse sleeve section 106 is split and carries a clamping collar 109 the purpose of which, when tightened, is to cause the sleeve section 106 to snugly embrace the associated transverse shaft or bar 35. Likewise, the rear sleeve section 107 snugly embraces the shaft or bar 99 when the clamps 108 are tightened. This construction thus provides for relatively free vertical hinging or pivoting of the link 105 relative to the bars 35 and 99 but the parts are held against swinging in a lateral direction, thereby providing for the desired lateral rigidity of the draft connection between the implement tool means and the associated draft bar on the tractor. As best shown in Figure 2, each of the draft links 105 is formed so that the rear end is offset relative to the forward end so as to provide for lateral adjustment of the tool by reversing the position of the link 105, as will be explained later.

An arm 111 is rigidly fixed, as by welding or the like, to the central portion of the shaft or bar 99 inwardly of the associated sleeve section 107 and is apertured at its upper end to receive a bolt or pin 112 by which an upper or stabilizing link means 113 is pivotally connected to the arm 111. The link member 113 includes an overload release toggle unit 120 pivotally connected at its rear end to the arm 111 and is fixedly connected at its forward end to a bar 121 which forms the forward section of the link member 113. The unit 120 is similar to the overload release unit shown in U. S. Patent No. 2,337,026, issued December 21, 1943, to John I. Cantral. The forward end of the bar 121 is threaded and adjustably receives a swivel member 114 which is pivoted to an arm 115 between the upper end of the latter and the upper end of a hammer strap 116 that is detachably connected to either the inner side or the outer side of the arm 115. The latter and the hammer strap 116 form a part of a bracket member 117 that is rigidly secured, as by welding, to the draft bar 35.

Spaced laterally inwardly of the bracket 117 is a second bracket member 118, and each of these bracket members is provided with an apertured rearwardly extending section in which a rockshaft 119 is mounted for rocking movement. The link means 113 extends in approximately parallel relation with respect to the draft link 105, the two parts converging forwardly at a relatively small angle. The laterally inner end of the rockshaft 119 is provided with an upwardly extending arm 123 which is pivotally connected to a link or lift pipe member 124 that extends rearwardly alongside the side of the tractor and at its rear end is connected with the associated power lift actuated arm 11.

A second arm 126 is fixed, as by clamping, to an intermediate portion of the rockshaft 119 and at its lower end is pivotally connected to a downwardly and rearwardly extending link 127. The lower end of the latter carries a gauge wheel structure 130 that includes a gauge wheel 131 and a gauge wheel carrying arm 132, the lower end of which is provided with a stub shaft 133 that receives the lower end of the link 127 and also the journal means on which the gauge wheel 131 is rotatably mounted. The upper end of the gauge wheel arm 132 is secured, as by welding, to a transverse sleeve section 135 that is disposed on the laterally inner portion of the transverse implement connecting bar 99, being held between the arm 111 and a set screw or clamping collar 136. A third arm 138 is fixed to the laterally outer end of the rockshaft 119 and at its rear end is provided with a laterally outwardly directed extension 139 which underlies the draft link member 105.

The operation of the implement described above is substantially as follows.

The implement is readily attached to the tractor by initially setting up the implement with the draft bars 34 and 35 swung slightly forwardly relative to the center section 43 so as to spread apart the rear portions of the attaching members 36 and 37, with suitable means, such as one or more supporting stands or the like, for holding the frame members 34, 35 and 43 and associated parts in the proper elevated position. The tractor may then be driven forwardly into the implement so that the tractor-carried socket member 75 snugly receives the center frame section 43. Then the right and left draft bars 34 and 35, together with associated implement unit or units, are swung rearwardly and the clamping bolts 80 and 81 tightened, after which the lift rods 124 may be connected in place.

Figure 4:
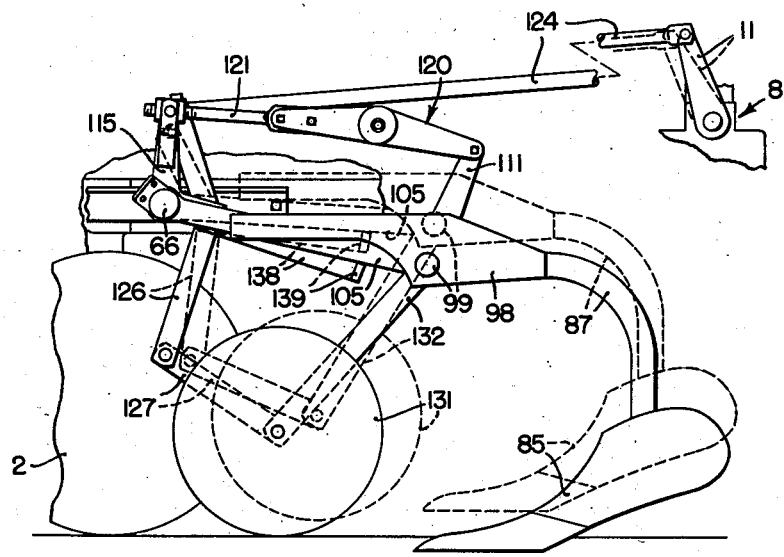
Figure 4 is a fragmentary view showing the tools in a shallow operating position and, in dotted lines, in a raised or transport position.

The implement is shown in Figure 1 in a normal operating position, and if it should be desired to operate the lister or bedder bottoms deeper, the tractor power lift unit 8 is operated so as to swing the arms 11 rearwardly, thus exerting a force acting through the lift pipes or links 124 against the downwardly extending arms 126, swinging the latter upwardly and forwardly and acting through the links 127 to permit the gauge wheels 131 to move upwardly relative to the associated tools 85, whereby the latter then operate at an increased depth. Conversely, if it should be desired to reduce the depth of operation, the power lift is operated so as to exert a forwardly directed thrust through the lift pipes 124 against the arms 123. This imparts a counterclockwise rotation to the rockshaft 119 and thus exerts a rearwardly directed thrust through the links 127 against the gauge wheel arms 132 and thus forces the gauge wheels 131 downwardly relative to the tools 85, thereby causing the latter to be lifted relative to the ground surface. During this adjusting action, the lift arm sections 139 that extend under the draft links 105 are normally spaced a short distance S below the latter so as to provide for up and down movement of each of the implement units 31 and 32, whereby the latter are permitted to follow surface irregularities. However, as best shown in dotted lines in Figure 4, if the tractor power unit 8 is operated to cause the arms 11 to continue to swing rearwardly, the rockshafts 119 are rocked to a point where the extensions 139 on the arms 138 begin to raise the draft links 105 so that at the end of the raising movement, the tools as well as the gauge wheels 131 are raised into their transport position.

If it should be desired to change the row spacing the links 105 may be reversed so as to dispose the rear laterally offset ends in a laterally inward position, rather than a laterally outward position, as shown in Figure 5. All that it is necessary to do to make this adjustment is to remove the caps 55 and 66, the clamps 108 and 109 and the rear halves of the split sleeves 107. The links 105 may then be reversed so as to dispose their rear ends in a laterally inward position and the caps, sleeve parts and clamps replaced. This disposes each of the link means 113 in a laterally inward position, which is accommodated by removing the hammer straps 116 and swivels 114 and reconnecting them to the arms 115 on the inner sides thereof.

While there has been shown and described above the preferred structure in which the principles of the present invention have been illustrated, it is to be understood that the present invention is not to be limited to the particular details shown and described above, but that, in fact, widely different means may be employed in the practice of the broader aspects of this invention.

What is claimed, therefore, and intended to be secured by Letters Patent is:

1. An integrally mounted implement comprising a draft bar adapted to be connected rigidly to a tractor or other support, a beam having a ground working tool connected therewith, a transverse member to which said beam is fixedly connected, a draft link pivotally connected at one end with said draft bar and at the other end with said transverse member, an arm fixed to said transverse member at one side of said beam, an arm fixed to said draft bar at one side of said draft link, a stabilizing link connecting said arms, a bell crank pivotally mounted on said draft bar, a gauge wheel disposed ahead of said ground working tool, an arm swingably mounted on said transverse member and extending downwardly and forwardly from said transverse member and receiving said gauge wheel, said bell crank having a first arm extending generally downwardly and rearwardly and a second arm extending generally downwardly and forwardly, a link extending downwardly and rearwardly from the lower end of said second arm to the forward end of said gauge wheel arm, and a lateral extension on the rear end of said first arm underlying said draft link and adapted to engage the latter to raise said beam and said gauge wheel.

2. An integrally mounted lister or bedder comprising a draft bar adapted to be connected rigidly to a tractor or other support, a lister beam having a lister bottom connected therewith, a transverse member to which said beam is fixedly connected, a draft link, means for connecting said link at one end with said draft bar and at the other end with said transverse member, said means including a rear sleeve extending transversely of and fixed at an intermediate point to the rear end of said draft link and rockably receiving said transverse member and a forward sleeve extending transversely of and fixed at an intermediate point to the front end of said draft link and rockably mounted on said draft bar adjacent the laterally outer end thereof, an arm fixed to said transverse member laterally inwardly of said rear sleeve, an arm fixed to said draft bar laterally inwardly of said front sleeve, a stabilizing link connecting said arms, a pair of rearwardly extending bracket portions fixed in laterally spaced apart relation to said draft bar laterally inwardly of said forward sleeve, a transverse shaft rockably carried by said bracket portions, three arms fixedly connected to said shaft, a gauge wheel disposed ahead of said lister bottom, an arm swingably mounted on said transverse member laterally inwardly of said first arm and carrying said gauge wheel, one of said three arms extending generally rearwardly and the others of said arms extending generally upwardly and downwardly, respectively, means connecting the downwardly extending arm with said gauge wheel arm, means connecting the rearwardly extending arm with said link, and means connected with the upper end of the third arm for rocking said transverse shaft so as to shift said gauge wheel arm and said draft link.

WALTER H. SILVER.
WILLIAM V. LOHRMAN.

REFERENCES CITED

The following references are of record in the file of this patent:

UNITED STATES PATENTS

| Number | Name | Date |
|---|---|---|
| 780,218 | McCloskey | Jan. 17, 1905 |
| 885,983 | Dewberry | Apr. 28, 1908 |
| 1,091,681 | Manderfield | Mar. 31, 1914 |
| 1,877,777 | Reynolds | Sept. 20, 1932 |
| 1,962,349 | Johnson | June 12, 1934 |
| 2,249,807 | Brown | July 22, 1941 |
| 2,328,173 | Silver | Aug. 31, 1943 |
| 2,423,148 | Johnson | July 1, 1947 |